United States Patent
Benson et al.

(10) Patent No.: US 12,499,377 B2
(45) Date of Patent: Dec. 16, 2025

(54) SYSTEM AND METHOD TO DETECT SYMPTOMS OF IMPENDING CLIMATE CONTROL FAILURES OF TRANSPORT CLIMATE CONTROL SYSTEMS

(71) Applicant: THERMO KING LLC, Minneapolis, MN (US)

(72) Inventors: Stephanie Deckas Benson, Prior Lake, MN (US); Wahid El Chaar, Burnsville, MN (US)

(73) Assignee: THERMO KING LLC, Minneapolis, MN (US)

( * ) Notice: Subject to any disclaimer, the term of this patent is extended or adjusted under 35 U.S.C. 154(b) by 1048 days.

(21) Appl. No.: 17/217,071

(22) Filed: Mar. 30, 2021

(65) Prior Publication Data

US 2022/0318646 A1 Oct. 6, 2022

(51) Int. Cl.
*G06N 20/00* (2019.01)
*B60H 1/32* (2006.01)
(Continued)

(52) U.S. Cl.
CPC ............ *G06N 5/04* (2013.01); *B60H 1/3225* (2013.01); *G05B 23/0254* (2013.01); *G06N 20/00* (2019.01)

(58) Field of Classification Search
None
See application file for complete search history.

(56) References Cited

U.S. PATENT DOCUMENTS

2011/0112814 A1 5/2011 Clark
2016/0131605 A1 5/2016 Hamrouni et al.
(Continued)

FOREIGN PATENT DOCUMENTS

WO 2019/204791 10/2019
WO 2020/060800 3/2020

OTHER PUBLICATIONS

Extended European Search Report, issued in the corresponding European patent application No. 22165432.0, dated Sep. 6, 2022, 7 pages.

*Primary Examiner* — David R Vincent
(74) *Attorney, Agent, or Firm* — HSML P.C.

(57) ABSTRACT

A method for predicting an impending climate control failure for a transport temperature control system (TCCS) is provided. The method includes a backend obtaining one or more operational parameters and/or one or more control parameters of transport temperature control systems including the TCCS. The method also includes obtaining warrantee data and/or service records for the transport temperature control systems. The method further includes training a machine learning model with the warrantee data and/or service records for the transport temperature control systems, and at least one of the operational parameters of the transport temperature control systems or the control parameters of the transport temperature control systems. Also the method includes deploying the trained machine learning model. The method further includes predicting the impending climate control failure for the TCCS based on the trained machine learning model, operational parameters of the TCCS, and/or control parameters of the TCCS.

16 Claims, 7 Drawing Sheets

(51) Int. Cl.
*G05B 23/02* (2006.01)
*G06N 5/04* (2023.01)

(56) References Cited

U.S. PATENT DOCUMENTS

| | | |
|---|---|---|
| 2020/0047587 A1 | 2/2020 | Maeng |
| 2020/0207326 A1 | 7/2020 | Wenger et al. |
| 2020/0238786 A1 | 7/2020 | Murphy et al. |
| 2021/0090359 A1* | 3/2021 | Griffiths ............ B60W 50/0225 |
| 2021/0396414 A1* | 12/2021 | Delgoshaei .......... G05B 19/042 |
| 2022/0057766 A1* | 2/2022 | Cao .................... G05B 23/0283 |

* cited by examiner

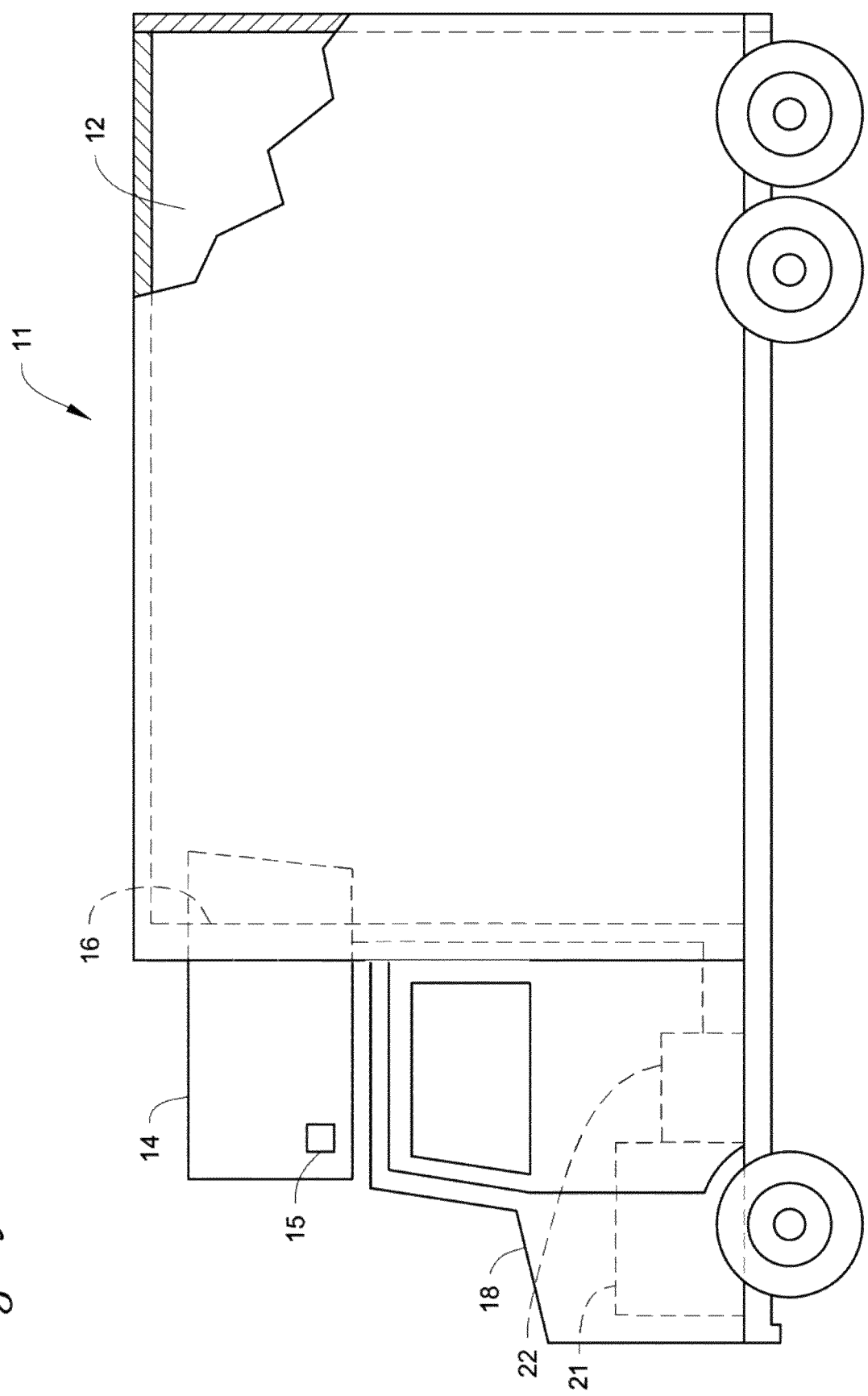

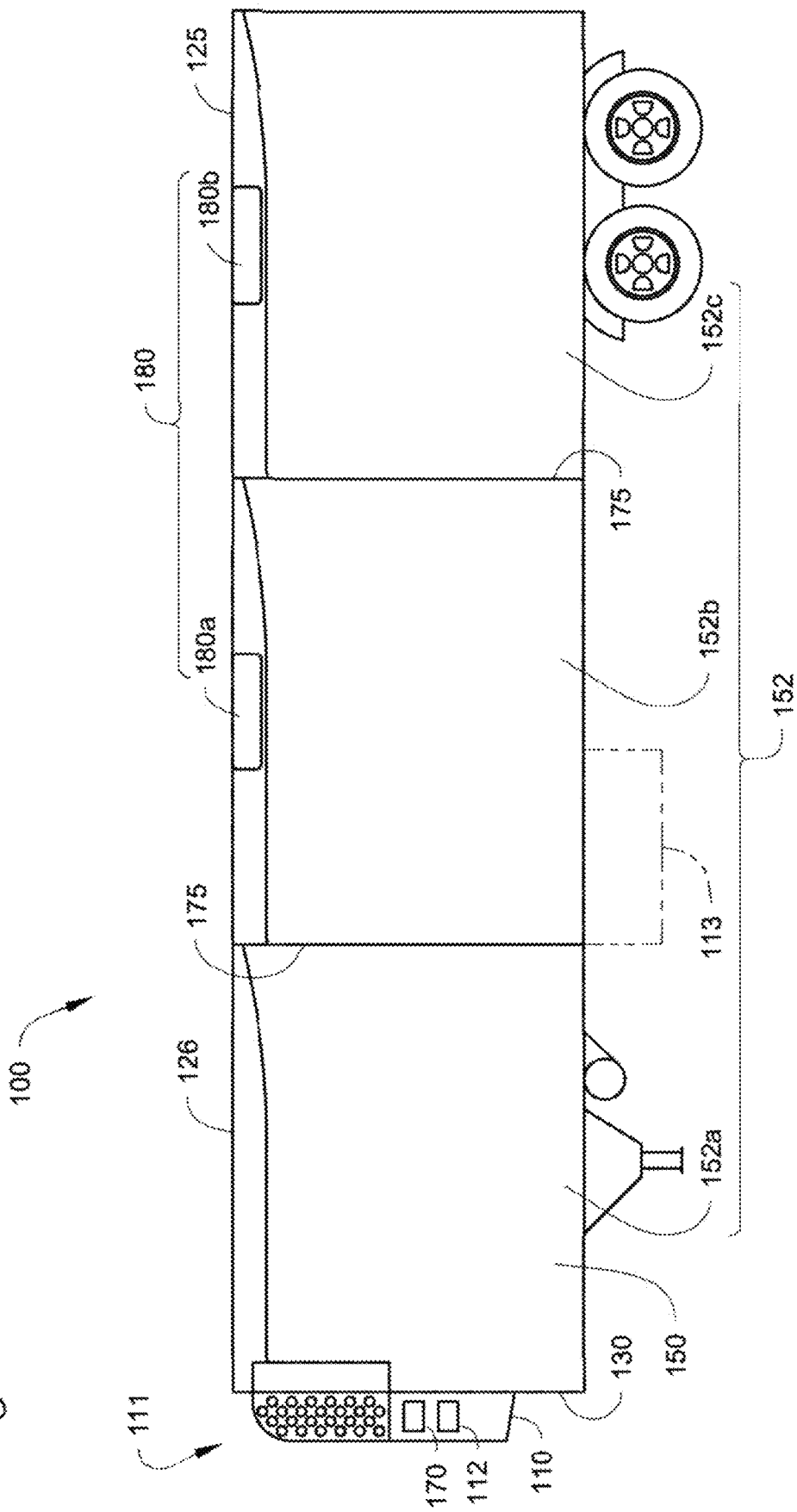

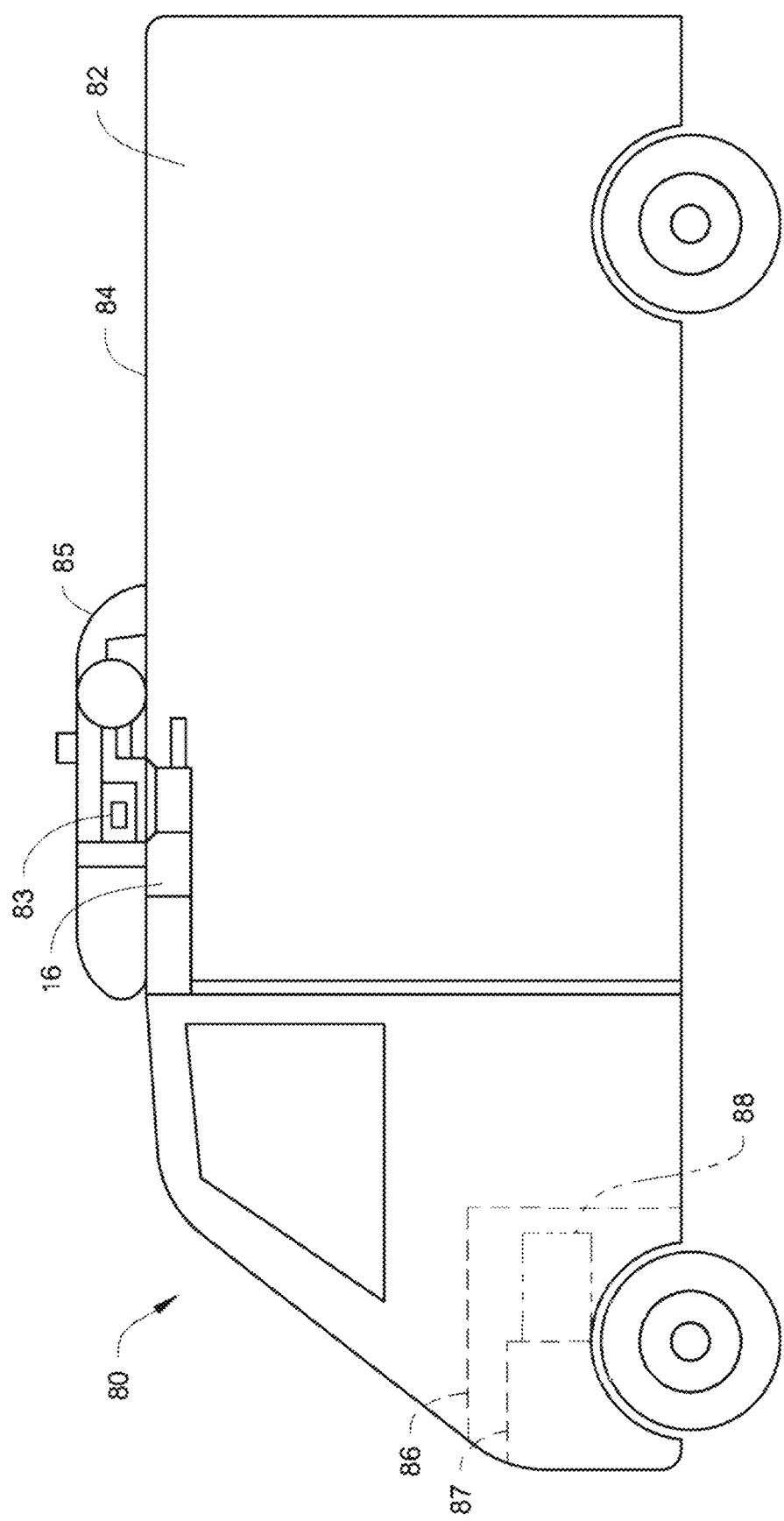

SYSTEM AND METHOD TO DETECT SYMPTOMS OF IMPENDING CLIMATE CONTROL FAILURES OF TRANSPORT CLIMATE CONTROL SYSTEMS

FIELD

This disclosure relates generally to a system and method for detecting symptoms of an impending climate control failure for a transport climate control system. More specifically, the disclosure relates to methods and systems for providing an advanced warning of a climate control failure mode for a transport climate control system via a machine learning system.

BACKGROUND

A transport climate control system (TCCS) can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS includes a transport refrigeration unit (TRU) and can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

When a failure of a TCCS such as a TRS carrying cargo (e.g., produce, frozen foods, pharmaceuticals, etc.) occurs on the road, the breakdown can cause operational disruptions for the users and can result in costly load loss. Embodiments disclosed herein provide a machine learning system that can analyze the TRS data and provide the users advanced warnings of TRS failure modes. As a result, the users can shift the unscheduled maintenance of the TRS due to the failures on the road to the predictive maintenance. It will be appreciated that when a TRS failure occurs on the road, TRS alarms can be raised but the alarms are typically "after-the-fact" to help with the diagnosis of the failure. The machine learning system disclosed herein can be prognostic in nature and can provide advance warnings of the climate control failure modes as well as the symptoms that indicate the failure.

Embodiments disclosed herein can also provide a sensitivity of the advanced warnings based on the risk tolerance of the individual user. Outputs of the machine learning system can provide a probability that the TCCS is "unhealthy" as well as the symptoms that indicate "unhealthy". The machine learning system can include internal monitoring that detects changes in the machine learning model performance and detects indicators indicating that the model needs to be updated, retrained, or retuned.

In one embodiment, a method for predicting an impending climate control failure for a TCCS is provided. The method includes a backend obtaining one or more operational parameters and/or one or more control parameters of transport temperature control systems including the TCCS. The method also includes obtaining warrantee data and/or service records for the transport temperature control systems. The method further includes training a machine learning model with the warrantee data and/or service records for the transport temperature control systems, and at least one of the operational parameters of the transport temperature control systems or the control parameters of the transport temperature control systems. Also the method includes deploying the trained machine learning model. The method further includes predicting the impending climate control failure for the TCCS based on the trained machine learning model, operational parameters of the TCCS, and/or control parameters of the TCCS. The method can include outputting the predicted impending climate control failure for the TCCS.

In another embodiment, a method for predicting an impending climate control failure for a TCCS is provided. The method includes a plurality of sensors sensing one or more operational parameters of transport temperature control systems including the TCCS and/or one or more controllers determining one or more control parameters of the transport temperature control systems. The method further includes telematics communicating the operational parameters and/or the control parameters of the transport temperature control systems to a backend. Also the method includes obtaining warrantee data and/or service records for the transport temperature control systems, and training a machine learning model with the warrantee data and/or service records for the transport temperature control systems, and at least one of the operational parameters of the transport temperature control systems or the control parameters of the transport temperature control systems. The method further includes deploying the trained machine learning model, and predicting the impending climate control failure for the TCCS based on the trained machine learning model, operational parameters of the TCCS, and/or control parameters of the TCCS. The method also includes performing a predictive maintenance on the TCCS based on the predicted impending climate control failure for the TCCS.

Other features and aspects will become apparent by consideration of the following detailed description and accompanying drawings.

BRIEF DESCRIPTION OF THE DRAWINGS

References are made to the accompanying drawings that form a part of this disclosure and which illustrate the embodiments in which systems and methods described in this specification can be practiced.

FIG. 1A illustrates a side view of a truck with a front wall mounted vehicle powered transport refrigeration unit, according to an embodiment.

FIG. 1B illustrates a schematic cross sectional side view of a refrigerated transport unit with a multi-temp transport refrigeration system, according to an embodiment.

FIG. 1E illustrates a side view of a van with a roof mounted vehicle powered transport refrigeration unit, according to an embodiment.

Like reference numbers represent like parts throughout.

DETAILED DESCRIPTION

Figure 1C:
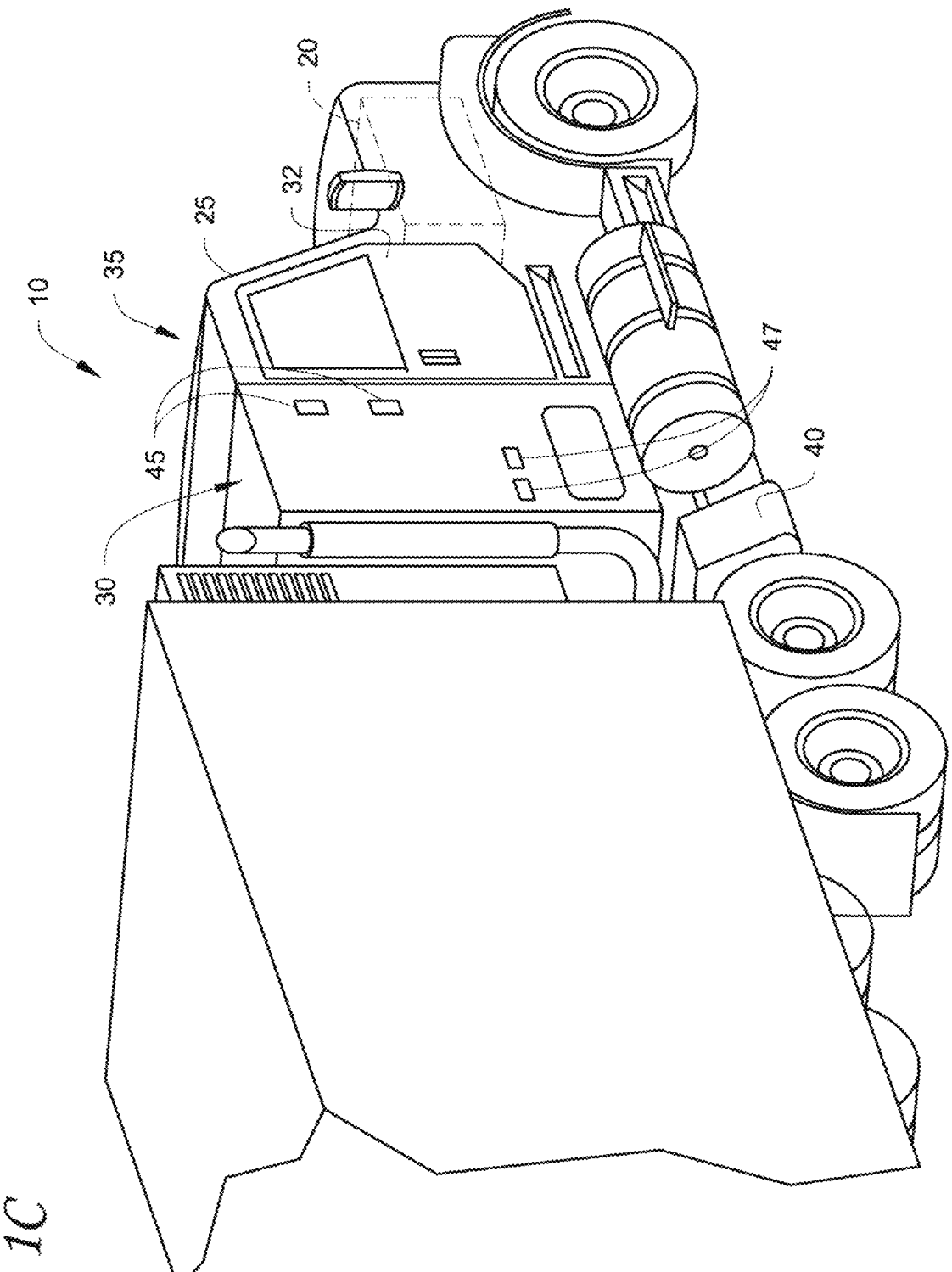
FIG. 1C illustrates a perspective view of a vehicle with an APU, according to an embodiment.

This disclosure relates generally to a machine learning system for detecting symptoms of an impending climate control failure for a transport climate control system. More specifically, the disclosure relates to methods and systems for providing an advanced warning of a climate control failure mode for a transport climate control systems via a machine learning system.

As defined herein, the term "alarm" may refer to an indicator (e.g., a warning) indicating that an issue (e.g., a TCCS failure, etc.) has occurred or is about to occur within a relatively short period of time, drawing the recipient's instant attention to the issue. The term "alert" may refers to an indicator (e.g., a warning) that draws the recipient's user's attention to the issue over an extended period of time before the issue may occur. It will be appreciated that alert may be refer to an advanced warning.

As defined herein, the term "unit" may refer to a TRU of a TRS or an HVAC system. As defined herein, the term "predictive maintenance" or "prognostic maintenance" may refer to a maintenance or service of a unit based on the condition of the unit in order to estimate when the maintenance may be performed. Predictive maintenance may save cost over routine or time-based maintenance, because the predictive maintenance is performed when warranted. Predictive maintenance may allow convenient scheduling of corrective maintenance and prevent unexpected unit failures. Predictive maintenance differs from preventive maintenance because it relies on the predicted condition of the unit, rather than the average or expected life statistics, to predict when the maintenance may be required. It will be appreciated that machine learning approaches may be adopted for the definition of the predicted condition of the unit and for forecasting its future states.

As defined herein, the term "backend" may refer to a part of a system (e.g., computer system or application) that is not directly accessed by a user, typically responsible for storing and processing data.

As defined herein, the term "coefficient of performance" of a unit may refer to a ratio of useful heating or cooling provided to work required, and may refer to a thermal dynamic matrix to measure how well the unit is cooling or heating its load. Carnot coefficient of performance may refer to coefficient for a maximum theoretical efficiency.

As defined herein, the term "data logging" may refer to a process of sensing data via sensor(s), analyzing the sensed data and storing the sensed data. As defined herein, the term "data logger" may refer to a data logging device of a unit. A controller of the unit and/or a data logger of the unit may communicate the data stored in the data logger with a remote backend (e.g., a host service) that is separate and away from the unit. In an embodiment, the data logger may be embedded in or with the controller. The data logger can be configured to receive and store real-time information (e.g., operational parameters sensed by sensor(s) of the unit) regarding the unit. The data logger can also operate as a telematics device and transmit the real-time information regarding the unit to the backend of a machine learning system. In an embodiment, the data logger can utilize, for example, a global system for mobile communications (GSM) or a general packet radio service (GPRS) to access real-time ambient temperature and/or humidity data external to the location of the unit or at a location determined by a position sensor of the unit.

As defined herein, the term "machine learning" may refer to an application of artificial intelligence (AI) that provides systems the ability to automatically learn and improve from experience without being explicitly programmed. Machine learning focuses on the development of computer programs that can access data and use the data to learn for themselves. Machine learning algorithms build a "trained machine learning model" based on sample data, known as "training data", in order to make predictions or decisions without being explicitly programmed to do so.

Embodiments disclosed herein provide a machine learning system for detecting symptoms of an impending climate control failure for a transport climate control system.

FIG. 1A depicts a temperature-controlled straight truck 11 that includes a conditioned load space 12 for carrying cargo. A TRU 14 is mounted to a front wall 16 of the load space 12. The TRU 14 is controlled via a controller 15 to provide temperature control within the load space 12. The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In one embodiment, the TRU 14 includes a vehicle electrical system. Also, in some embodiments, the truck 11 can be a hybrid vehicle that is powered by the prime mover 21 in combination with a battery power source or can be an electrically driven truck in which the prime mover 21 is replaced with an electric power source (e.g., a battery power source).

While FIG. 1A illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit.

FIG. 1B illustrates one embodiment of a MTRS 100 for a TU 125 that can be towed, for example, by a tractor (not shown). The MTRS 100 includes a TRU 110 that provides environmental control (e.g. temperature, humidity, air quality, etc.) within an internal space 150 of the TU 125. The MTRS 100 also includes a MTRS controller 170 and one or more sensors (e.g., Hall effect sensors, current transducers, etc.) that are configured to measure one or more parameters (e.g., ambient temperature, compressor suction pressure, compressor discharge pressure, supply air temperature, return air temperature, humidity, etc.) of the MTRS 100 and communicate parameter data to the MTRS controller 170. The MTRS 100 is powered by a power module 112. The TRU 110 is disposed on a front wall 130 of the TU 125. In other embodiments, it will be appreciated that the TRU 110 can be disposed, for example, on a rooftop 126 or another wall of the TU 125.

In some embodiments, the MTRS 100 can include an undermount unit 113. In some embodiments, the undermount unit 113 can be a TRU that can also provide environmental control (e.g. temperature, humidity, air quality, etc.) within the internal space 150 of the TU 125. The undermount unit 113 can work in combination with the TRU 110 to provide redundancy or can replace the TRU 110. Also, in some embodiments, the undermount unit 113 can be a power module that includes, for example, a generator that can help power the TRU 110.

The programmable MTRS Controller 170 may comprise a single integrated control unit or may comprise a distributed network of TRS control elements. The number of distributed control elements in a given network can depend upon the particular application of the principles described herein. The MTRS controller 170 is configured to control operation of the MTRS 100.

As shown in FIG. 1B, the power module 112 is disposed in the TRU 110. In other embodiments, the power module 112 can be separate from the TRU 110. Also, in some embodiments, the power module 112 can include two or more different power sources disposed within or outside of the TRU 110. In some embodiments, the power module 112 can include one or more of a prime mover, a battery, an alternator, a generator, a solar panel, a fuel cell, etc. Also, the prime mover can be a combustion engine or a microturbine engine and can operate as a two speed prime mover, a variable speed prime mover, etc. The power module 112 can provide power to, for example, the MTRS Controller 170, a compressor (not shown), a plurality of DC (Direct Current) components (not shown), a power management unit (not shown), etc. The DC components can be accessories or components of the MTRS 100 that require DC power to operate. Examples of the DC components can include, for example, DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

The power module 112 can include a DC power source (not shown) for providing DC electrical power to the plurality of DC components (not shown), the power management unit (not shown), etc. The DC power source can receive mechanical and/or electrical power from, for example, a utility power source (e.g., Utility power, etc.), a prime mover (e.g., a combustion engine such as a diesel engine, etc.) coupled with a generator machine (e.g., a belt-driven alternator, a direct drive generator, etc.), etc. For example, in some embodiments, mechanical energy generated by a diesel engine is converted into electrical energy via a generator machine. The electrical energy generated via the belt driven alternator is then converted into DC electrical power via, for example, a bi-directional voltage converter. The bi-directional voltage converter can be a bi-directional multi-battery voltage converter.

The internal space 150 can be divided into a plurality of zones 152. The term "zone" means a part of an area of the internal space 150 separated by walls 175. It will be appreciated that the invention disclosed herein can also be used in a single zone TRS.

The MTRS 100 for the TU 125 includes the TRU 110 and a plurality of remote evaporator units 180. In some embodiments, an HVAC system can be powered by an Auxiliary Power Unit (APU, see FIGS. 1C and 1D). The APU can be operated when a main prime mover of the TU 125 is turned off such as, for example, when a driver parks the TU 125 for an extended period of time to rest. The APU can provide, for example, power to operate a secondary HVAC system to provide conditioned air to a cabin of the TU 125. The APU can also provide power to operate cabin accessories within the cabin such as a television, a microwave, a coffee maker, a refrigerator, etc. The APU can be a mechanically driven APU (e.g., prime mover driven) or an electrically driven APU (e.g., battery driven).

The tractor includes a vehicle electrical system for supplying electrical power to the electrical loads of the tractor, the MTRS 100, and/or the TU 125.

FIG. 1C illustrates a vehicle 10 according to one embodiment. The vehicle 10 is a semi-tractor that is used to transport cargo stored in a cargo compartment (e.g., a container, a trailer, etc.) to one or more destinations. Hereinafter, the term "vehicle" shall be used to represent all such tractors and trucks, and shall not be construed to limit the invention's application solely to a tractor in a tractor-trailer combination. In some embodiments, the vehicle 10 can be, for example, a straight truck, van, etc.

The vehicle 10 includes a primary power source 20, a cabin 25 defining a sleeping portion 30 and a driving portion 35, an APU 40, and a plurality of vehicle accessory components 45 (e.g., electronic communication devices, cabin lights, a primary and/or secondary HVAC system, primary and/or secondary HVAC fan(s), sunshade(s) for a window/windshield of the vehicle 10, cabin accessories, etc.). The cabin 25 can be accessible via a driver side door (not shown) and a passenger side door 32. The cabin 25 can include a primary HVAC system (not shown) that can be configured to provide conditioned air within driving portion 35 and potentially the entire cabin 25, and a secondary HVAC system (not shown) for providing conditioned air within the sleeping portion 30 of the cabin 25. The cabin 25 can also include a plurality of cabin accessories (not shown). Examples of cabin accessories can include, for example, a refrigerator, a television, a video game console, a microwave, device charging station(s), a continuous positive airway pressure (CPAP) machine, a coffee maker, a secondary HVAC system for providing conditioned air to the sleeping portion 30.

The primary power source 20 can provide sufficient power to operate (e.g., drive) the vehicle 10 and any of the plurality of vehicle accessory components 45 and cabin accessory components 47. The primary power source 20 can also provide power to the primary HVAC system and the secondary HVAC system. In some embodiments, the primary power source can be a prime mover such as, for example, a combustion engine (e.g., a diesel engine, etc.).

The APU 40 is a secondary power unit for the vehicle 10 when the primary power source 20 is unavailable. When, for example, the primary power source 20 is unavailable, the APU 40 can be configured to provide power to one or more of the vehicle accessory components, the cabin accessories, the primary HVAC system and the secondary HVAC system. In some embodiments, the APU 40 can be an electric powered APU. In other embodiments, the APU 40 can be a prime mover powered APU. The APU 40 can be attached to the vehicle 10 using any attachment method. In some embodiments, the APU 40 can be turned on (i.e., activated) or off (i.e., deactivated) by an occupant (e.g., driver or passenger) of the vehicle 10. The APU 40 generally does not provide sufficient power for operating (e.g., driving) the vehicle 10. The APU 40 can be controlled by an APU controller 41.

Figure 1D:
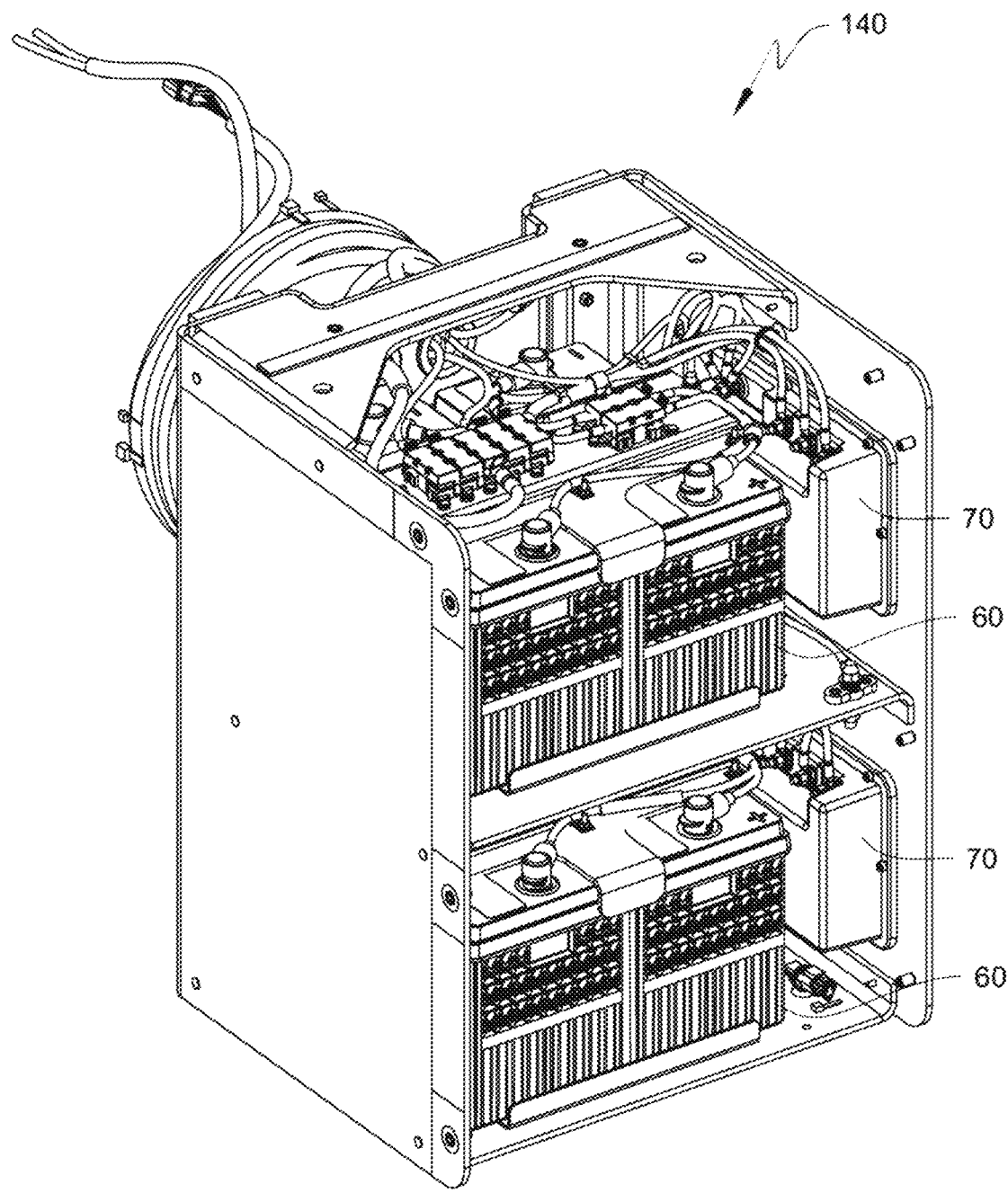
FIG. 1D illustrates a front perspective view of an APU, according to an embodiment.

FIG. 1D illustrates an electric APU 140 that can be used with a vehicle (e.g., the vehicle 10 shown in FIG. 1C), according to one embodiment. The APU 140 includes a plurality of energy storage elements 60 each of which is coupled to one of a plurality of converters 70. The converters 70 can provide electric power (e.g., AC or DC power) generated by the APU 140 to one or more vehicle accessory components, cabin accessory components, a primary HVAC system, and a secondary HVAC system. A secondary HVAC system can provide conditioned air to a sleeping portion of a vehicle cabin (e.g., the sleeping portion 30 of the cabin 25 shown in FIG. 1C). The energy storage elements 60 can be, for example, battery packs, fuel cells, etc. In some embodiments, the APU 140 can be turned on or off by an occupant (e.g., driver or passenger) of the vehicle. For example, the occupant can turn on the APU 140 to provide power stored in the energy storage elements 60 when a primary power source of the vehicle is turned off. It will be appreciated that the embodiments described herein can also be used with a prime mover powered APU.

In some embodiments, the APU (e.g., the APU 40 as shown in FIG. 1C and/or the APU 140 as shown in FIG. 1D) includes a vehicle electrical system.

FIG. 1E depicts a temperature-controlled van 80 that includes a conditioned load space 82 (or internal space) for carrying cargo. A transport refrigeration unit (TRU) 85 is mounted to a rooftop 84 of the load space 82. The TRU 85 is controlled via a controller 83 to provide temperature control within the load space 82. The van 80 further includes a vehicle power bay 86, which houses a prime mover 87, such as a combustion engine (e.g., diesel engine, etc.), that provides power to move the van 80 and to operate the TRU 85. In some embodiments, the prime mover 87 can work in combination with an optional machine 88 (e.g., an alternator) to operate the TRU 85. In one embodiment, the TRU 85 includes a vehicle electrical system. Also, in some embodiments, the van 80 can be a hybrid vehicle that is powered by the prime mover 87 in combination with a battery power source or can be an electrically driven truck in which the prime mover 87 is replaced with an electric power source (e.g., a battery power source).

Figure 2:
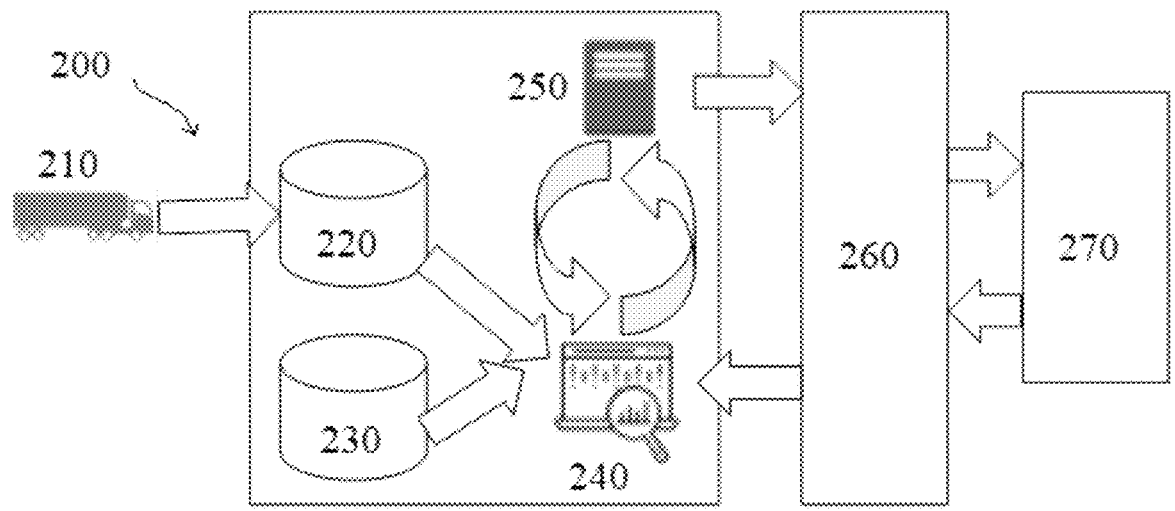
FIG. 2 illustrates a schematic view of a system for detecting symptoms and providing advanced warnings of an impending climate control failure for a transport climate control system, according to an embodiment.

FIG. 2 illustrates a schematic view of a system 200 for detecting symptoms and providing advanced warnings of an impending climate control failure for a transport climate control system, according to an embodiment.

The system 200 includes unit(s) 210. The unit(s) 210 can include, for example, the transport refrigeration unit/system of FIGS. 1A, 1B, 1C, and 1E. The unit(s) 210 can also include one or more sensors (e.g., Hall Effect sensors, current transducers, etc.) that are configured to measure one or more operational parameters (e.g., ambient temperature, internal space temperature, compressor suction pressure, compressor discharge pressure, discharge air temperature, supply air temperature, return air temperature, evaporator coil temperature, condenser coil temperature, ambient humidity, internal space humidity, prime mover status, prime mover revolutions per minute (RPM), shunt current (the current from the alternator that changes the battery), battery voltage, electronic throttling valve (ETV) position, vehicle position, discharge pressure temperature saturation, minimum pressure temperature saturation, minimum discharge pressure, prime mover coolant temperature, prime mover intercooler temperature, prime mover cooling fan request, prime mover intercooler fan request, etc.). It will be appreciated that the sensors included in the unit(s) 210 are not limited to those listed, and include any suitable type and/or any suitable number of sensors that are suitable for use with the unit(s) 210. The sensor(s) can sense or detect the value or data of the operational parameters, and a data logger of the unit(s) can be configured to save the sensed operational parameters or data.

The unit(s) 210 can further include a controller. The controller can be the controller 15 of FIG. 1A, the controller 170 of FIG. 1B, the controller 41 of FIG. 1C, or the controller 83 of FIG. 1E. The controller can determine control parameters of the unit(s) 210 such as whether the unit(s) 210 is/are in high (or low) speed heat (or cool or modulation), whether the unit(s) 210 is/are in start-stop mode (or continuous mode), the setpoint temperature of the unit(s) 210, the operating mode of the unit(s) 210, etc. In an embodiment, the data logger of the unit(s) 210 can be configured to save the determined control parameters. The controller and/or the data logger of the unit(s) 210 can be configured to communicate the operational parameters and/or the control parameters stored in the data logger with a backend of a machine learning system that is separate and away from the unit(s) 210 via telematics of the unit(s) 210. In an embodiment, the communication between the controller and/or the data logger of the unit(s) 210 and the backend can be daily communication (or communication in any suitable predetermined period of time) or real-time communication, and the parameters communicated can be marked and associated with timestamps indicating when the parameters are obtained/detected/sensed. In an embodiment, the controller or the data logger includes the telematics. In another embodiment, the controller or the data logger is separate from and independent to the telematics.

The system 200 also includes a data store 220 configured to store the operational parameters and/or the control parameters of the unit(s) 210. In an embodiment, the data store 220 can be a part of the backend. The system 200 further includes a data store 230 configured to store warrantee data (or warrantee claims, indicating that the unit had specific failures on a specific day) and/or service records (including records for work that occurs outside the warranty period and/or warrantee data) from users (e.g., TCCS dealer(s), etc.). In an embodiment, besides or in addition to the warrantee data and/or service records, the data store 230 can be configured to store other information such as service records/history of the unit (e.g., data from units that are on service contracts, etc.), data from production (e.g., model, options equipped on the unit, manufacturing date, etc.), etc. In an embodiment, the data store 230 can be a part of the backend.

The system 200 further includes a machine learning system including a machine learning model 240. Data stored in data stores (220, 230) can be fed (e.g., by the backend) into the machine learning model 240 as training data to train the model 240.

It will be appreciated that the operational parameters and/or the control parameters stored in the data store 220 can be "raw data" (i.e., not processed data). The warranty data stored in the data store 230 can be filtered to obtain desired warranty data containing parameters including e.g., status of the unit. Raw data obtained from the unit(s) 210 can be joined with the filtered warranty data of the unit(s) 210 to obtain "ground truth" data (to train a machine learning model e.g., to look for patterns that precede a climate control failure) for specific unit failure modes.

For units that have failed (e.g., climate control failures such as compressor failures, working fluid (e.g., refrigerant, etc.) leaks, battery failures, etc. have already occurred), the raw data from the units can be filtered to a "data window" based on the timestamps of the raw data and the timestamp of the occurrence of the climate control failure. In an embodiment, the "data window" can be 60 prime mover hours and such window can include data between the timestamp of the climate control failure minus 90 prime mover hours and the timestamp of the climate control failure minus 30 prime mover hours. It will be appreciated that prime mover hours can be defined as prime mover run time.

It will be appreciated that the "data window" may be adjusted and can be any suitable period of time. For units without a climate control failure, the "data window" would be a period of time containing data that is at least a predetermined period of time old (i.e., data having timestamp that is at least the predetermined period of time earlier than current time). For example, the 'data window' can contain data that is at least three months old. This is because the users (e.g., dealers, etc.) may have e.g., about sixty days to file a warranty claim after the users perform the repair of the unit. As such, data that is classified as or appears to be "healthy" may belong to a unit that had a warranty claim that has not been filed yet. Thus, data (for units that appear to be "healthy") that is less than three months old may not be used.

It will be appreciated that climate control failures can include battery failures, charging system failures, and mechanical failures such as compressor failures, working fluid leaks, expansion valve failures, evaporate coil failures, condenser coil failures, ETV failure, idler assembly failures, tensioner failures, belt failures, alternator failures, refrigeration valve failures, prime mover failures, fuel pump failures, temperature sensor failures, pressure transducer failures, etc. It will also be appreciated that each climate control failure may associate with a set of data or parameters. For example, battery failures may associate with e.g., the ambient temperature, the shunt current, and/or the battery voltages, etc. Abnormality of the ambient temperature, the shunt current, and/or the battery voltages may indicate that there may be a battery failure soon. Typical climate control failures may associate with e.g., the ETV position, the suction pressure, and/or the discharge pressure, etc. Abnormality of the ETV position, the suction pressure, and/or the discharge pressure may indicate that there may be a climate control failure soon.

Once the set of data or parameters are determined (e.g., chosen or selected) for a particular climate control failure, the raw data and/or the warrantee data and/or service records can be preprocessed. In an embodiment, features can be derived from preprocessing the raw data and/or the warrantee data and/or service records based on e.g., domain knowledge of the unit. The derived features can include a delta T (the difference between returning air temperature and discharge air temperature for air out of and/or into the evaporator coil), climate control efficiency (e.g., a difference between an internal space temperature inside a climate controlled transport unit and a desired temperature setpoint), ambient setpoint differential (e.g., the difference in temperature between the ambient air temperature and a setpoint temperature), return air setpoint differential (e.g., the difference in temperature between the return air temperature and a setpoint temperature), and Carnot coefficient of performance. It will be appreciated that the raw data, the derived features, and the warrantee data and/or service records have a timestamp associated with each of them and thus they can be considered as time series data.

In an embodiment, the determined set of raw data, the warrantee data and/or service records, and/or the derived features can be inputted or fed into a preprocess module (e.g., TSFresh(c) or other suitable modules) to generate e.g., time series characteristics (referred to as "aggregated features") of the input raw data and/or derived features. The preprocess module can be configured to take the raw data and/or derived features as input, for each unit the preprocess module can extract and/or generate information from each parameter (e.g., ambient temperature, etc.). The preprocess module can be configured to extract and/or generate e.g., statistical characteristics or aggregated features (such as the mean, the standard deviation, etc.), comprehensively summarize the characteristics of each parameter in the raw data, and convert the aggregated features into a format that is suitable for the machine learning model 240. The preprocess module can also be configured to determine and select the aggregated features that are statistically significant to determine, e.g., the health of the unit, as the output of the preprocess module.

The output (e.g., the determined aggregated features, referred to as "feeding features" to feed into and train the model) of the preprocess module can be joined with alarm data and derived unit features as input to the machine learning model 240. In an embodiment, the alarm data can be the number of each alarm code associated with specific failure modes that occur during the data window. It will be appreciated that alarm codes can be thrown/generated by the controller to indicate an anomalous state. For example, an alarm code "10" can indicate "High Discharge Pressure", an alarm code "89" can indicate "Check Electronic Throttling Value (ETV) Circuit", etc. The derived unit features can be data/features derived from the parameters of the unit obtained e.g., with in the past year (starting from current timestamp). The derived unit features can include, for example, the number of starts per engine hour, the number of engine hours per year, the age of the unit, etc.

In an embodiment, the machine learning model 240 can include e.g. a scikit-learn(c) Gradient Boosted Tree algorithm(c). In other embodiments, the machine learning model 240 can include e.g., Neural Networks, Convolutional Neural Networks, Recursive Neural Networks, Support Vector Machines, Linear Classifiers, or other suitable machine learning model.

The machine learning model 240 can be trained (e.g., using the "ground truth" data such as the output of the preprocess module, the alarm data, and/or the derived unit features, etc.) to classify the unit as e.g., "healthy" or "unhealthy". The trained machine leaning model can be deployed e.g., by a model deployment infrastructure 250. In an embodiment, the model deployment infrastructure 250 can include a processor to execute the trained and/or deployed machine learning model to process and analyze new unit data (e.g., new daily unit parameters or data from unit(s) 210 through the data store 220, new warrantee data and/or service records through the data store 230, etc.) from a unit, and the trained model can output a probability that the unit is "unhealthy". In another embodiment, instead of a probability that the unit is "healthy" or "unhealthy", a regression can be used where the output of the machine learning model 240 can be a numerical value representing remaining useful unit life.

The model deployment infrastructure 250 can alert (e.g., sending or alerting advanced warnings to) the recipient 260 (e.g., a TCCS dealer or customer) based on the probability of "unhealthy". In an embodiment, if the probability of "unhealthy" exceeds a predetermined threshold (e.g., at or around or greater than 90%, which can be defined as a high probability), the model deployment infrastructure 250 may alert the recipient 260 immediately. If the probability of "unhealthy" is at or below a predetermined threshold (e.g., at or around or less than 65%, which can be defined as a marginal probability), the model deployment infrastructure 250 may wait for additional information to confirm the "unhealthy" classification prior to alerting the recipient 260. In an embodiment, advanced warnings can be e.g., displayed via e.g., a website, a display device, etc.

It will be appreciated that the predetermined threshold can be changed, for example, based on a risk tolerance of the individual recipient 260 or the individual operator 270 (e.g., a driver of the unit, a cargo carrier, etc.). For example, if the operator 270 of the unit is hauling highly sensitive cargo, such as pharmaceuticals, the operator 270 may want to know even if there is a slight risk of an impending climate control failure. In this case, the predetermined alert threshold can be lower than operators hauling insensitive cargo (e.g., non-perishable goods). Similarly, operators hauling insensitive cargo may not want to be alerted unless the possibility is high enough to avoid false positives, and the predetermined alert threshold can be higher than operators hauling sensitive cargo. It will be appreciated that a "false positive" may refer to a situation where an alert is issued even though the climate control failure did not occur, and that a "false negative" may refer to a situation where an alert is not issued but a climate control failure has occurred. A sensitivity (e.g., indicating when to send the alert) of the advanced warnings can be based on the risk tolerance of the user (e.g., recipient 260 and/or operator 270). The machine learning model 240 can be tuned to optimize for the user's risk tolerance.

After the recipient 260 receives the alert or advanced warning(s) from the model deployment infrastructure 250 e.g., through e-mail, message (e.g., Short Message Service (SMS) message, Multimedia Messaging Service (MMS) message, Enhanced Messaging Service (EMS) message, Rich Communication Services (RCS) message, etc.), or any other suitable communication, the recipient 260 can notify the operator 270 to bring the unit (e.g., unit(s) 210) back for inspection (to conduct predictive maintenance on the unit). After inspection, a repair on the unit may be conducted e.g., by the recipient 260 based on the inspection results. The recipient 260 can send feedback data based on the inspection results to e.g., the backend through e-mail, message (e.g., SMS message, MMS message, EMS message, RCS message, etc.), or any other suitable communication. The machine learning model 240 can be trained or retrained based on the feedback data (e.g., indicating the field operational and/or control parameters of the unit, whether there is climate control failure in the unit, the failure mode, inspection checklist, whether the actions in the checklist work, the repairs (if any) conducted on the unit, etc.). It will be appreciated that the feedback data can be independent and/or different from the warrantee data or claims and/or service records. It will also be appreciated that the feedback data can be used by the model deployment infrastructure 250 to clear the alert or advanced warnings to the recipient 260 if the failure is fixed, can indicate whether the prediction made by the trained model is correct, and can be used to update or retrain the model.

Figure 3:
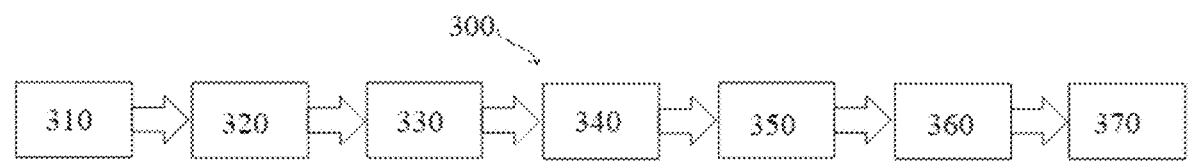
FIG. 3 is a flow chart illustrating a process of the system of FIG. 2 detecting symptoms and providing advanced warnings of an impending climate control failure for a transport climate control system, according to an embodiment.

FIG. 3 is a flow chart illustrating a process 300 of the system 200 of FIG. 2 detecting symptoms and providing an advanced warning of an impending climate control failure for a transport climate control system, according to an embodiment.

The process 300 begins at 310 where performance data (e.g., operational parameters, control parameters, warrantee data and/or service records, output of the preprocess module, the alarm data, the derived unit features, feedback data, etc.) from the unit (e.g., unit(s) 210 of FIG. 2) obtained and determined. For example, as described in the description of FIG. 2, the unit(s) 210 can include one or more sensors configured to measure one or more operational parameters and a controller configured to determine one or more control parameters. The operational parameters and/or the control parameters can be saved in a data logger of the unit(s) 210. The controller and/or the data logger can be configured to communicate the operational parameters and/or the control parameters with a backend of a machine learning system and to save the operational and control parameters in a data store of the backend. Users can save the warrantee data and/or service records to a data store of the backend. The determined set of raw data, the warrantee data and/or service records, and/or the derived features can be inputted or fed into a preprocess module to generate e.g., time series characteristics. The process then proceeds to 320.

At 320, as described in the description of FIG. 2, the system 200 of FIG. 2 (including the machine learning model 240) can analyze the data for signs of impending failure (e.g., an impending climate control failure) of the unit. For example, the machine learning model 240 can be trained using the "ground truth" data such as the output of the preprocess module, the alarm data, and/or the derived unit features, etc.; and the model deployment infrastructure 250 can include a processor to execute the trained machine learning model to process and analyze new unit data (e.g., new daily unit parameters or data from unit(s) 210 through the data store 220, new warrantee data and/or service records through the data store 230, etc.) from a unit, and the trained model can output a probability that the unit is "unhealthy". The process then proceeds to 330.

At 330, as described in the description of FIG. 2, the system 200 of FIG. 2 (including the model deployment infrastructure 250) can alert (e.g., sending or alerting advanced warnings to) the recipient 260 e.g., through e-mail, message (e.g., SMS message, MMS message, EMS message, RCS message, etc.), via a website or a display device (e.g., displaying the advanced warnings on a website, on a display device, etc.), or via any other suitable communication, based on the probability of "unhealthy". For example, if the probability of "unhealthy" exceeds a predetermined threshold, the model deployment infrastructure 250 may alert the recipient 260 immediately. If the probability of "unhealthy" is at or below the predetermined threshold, the model deployment infrastructure 250 may wait for additional information to confirm the "unhealthy" classification prior to alerting the recipient 260. As discussed above, the "data window" can be 60 prime mover hours and such window can include data between the timestamp of the climate control failure minus 90 prime mover hours and the timestamp of the climate control failure minus 30 prime mover hours. In such case, a 30 prime mover hour advance notice (advanced warnings) can be provided by the system 200 regarding the impending climate control failure of the unit(s) 210. The process then proceeds to 340.

At 340, the recipient (of the advanced warnings) 260 (e.g., a TCCS dealer) of FIG. 2 can communicate (e.g., through e-mail, phone, message (e.g., SMS message, MMS message, EMS message, RCS message, etc.), or any other suitable communication) with the operator 270 of the unit(s) 210 to bring the unit in for inspection or predictive maintenance. The process then proceeds to 350. At 350, the operator 270 can bring the unit to the recipient 260 for predictive maintenance. The process then proceeds to 360.

At 360, the recipient 260 can conduct or perform the predictive maintenance (e.g., conducting an inspection on specified components of the unit based on the information contained in the alert) on the unit and/or repair the unit as necessary. The process then proceeds to 370. At 370, the recipient 260 can send feedback data based on the results of the predictive maintenance to e.g., the backend of the system 200 through e-mail, message (e.g., SMS message, MMS message, EMS message, RCS message, etc.), or any other suitable communication. It will be appreciated that the feedback data from 370 can be fed back to 310 as performance data of the unit, to form a loop for the process 300.

Figure 4:
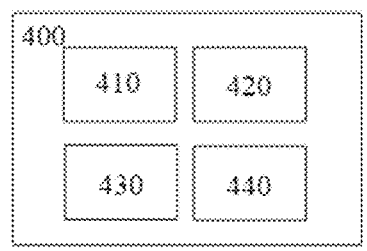
FIG. 4 illustrates a schematic view of a machine learning system of the system of FIG. 2, according to an embodiment.

FIG. 4 illustrates a schematic view of a machine learning system 400 of the system 200 of FIG. 2, according to an embodiment.

The machine learning system 400 includes a training module 410. The training module 410 is configured to generate a machine learning model (e.g., 240 of FIG. 2). In an embodiment, raw data (e.g., operational parameters and/or control parameters from the units, warrantee data and/or service records for the units, etc.) is fed into the training module 410. In the training module 410, a preprocess can be performed on the raw data. For example, pre-determined filters can be applied to the raw data (e.g., to select features or parameters associated with specific climate control failures, to select specific or eligible units, etc.). The units can be labeled as "healthy" or "unhealthy" based on warranty data (e.g., where warrantee claims have been filed regarding specific climate control failures occurred in the field—if failure occurred, the unit is unhealthy; if no failure occurred, the unit is healthy). A data window (e.g., the last 60 prime mover hours before a zero prime mover hour to 30 prime mover hours blackout window; such window can include data between the timestamp of the climate control failure minus 90 prime mover hours and the timestamp of the climate control failure minus 30 prime mover hours) can be selected. It will be appreciated that the raw data and the preprocessed data that have timestamp associated with them and can be referred to as "time series data". In the training module 410, the time series data can be further processed to obtain aggregated features (selected based on specific climate control failures). The derived unit features (e.g., the number of starts per prime mover hour, the number of prime mover hours per year, the age of the unit, etc.), the time series data, and the aggregated features can be used to train and generate a machine learning model (e.g., 240 of FIG. 2).

The generated machine learning model (e.g., 240 of FIG. 2) can be deployed for inference. The machine learning system 400 includes an inference module 420. The inference module 420 is configured to predict an impending climate control failure for a unit (e.g., to identify the unit that has the pattern for any pending failure) using the generated and/or deployed and/or trained model based on new data of the unit (e.g., new daily operational and/or control parameters, new warrantee data and/or service records if any, etc.). It will be appreciated that the new data of the unit is to be preprocessed (similar to preprocessing raw data to obtain input data to train the model) to obtain input for the inference module 420 having the trained model. In an embodiment, the inference module 420 can take the input, execute the trained model using the input, and output a probability that the unit is "unhealthy". In another embodiment, instead of a probability that the unit is "healthy" or "unhealthy", a regression can be used where the output of the inference module 420 can be a numerical value representing remaining useful unit life, or other suitable output.

The machine learning system 400 also includes an alert module 430. The alert module 430 is configured to send an advanced warning to the recipient (e.g., 260 of FIG. 2). It will be appreciated that the alert module 430 can include a model interpretation module (e.g., ELI5(c) or other suitable module) that interprets or transforms the outputs (e.g., machine learning classifiers for the predicted impending climate control failure) from the inference module 420 and explain their predictions as an advanced warning that can be understood by the recipient. In an embodiment, once a unit is classified as "unhealthy" by the inference module 420, the data of the unit (including which features contributed to the "unhealthy" prediction, recipient's identification, etc.) can be sent to the model interpretation module of the alert module 430 to explain the symptoms that indicated the climate control failure. The model interpretation module can be configured to provide performance-based motivation (e.g., the reason to bring a certain unit to the recipient 260 of FIG. 2) for the operator 270 to bring the unit in for inspection (predictive maintenance) and to aid users such as the technician in the diagnosis of the unit. In an embodiment, the model interpretation module takes training data (e.g., input data to the training module 410) and the inference data (e.g., output data from the inference module 420), and translates the prediction results into explanations understandable to the recipient 260. In an embodiment, the alert module 430 can also include a prediction processor configured to generate final predictions based on the stability of the predictions over time.

The alert module 430 can obtain contact information (e.g., pre-stored in a data store) about the recipient 260 of FIG. 2 that matches the recipient's identification from the data of the unit, to communicate alert or advanced warnings (e.g., 30 prime mover hours advance warning based on a 60 prime mover hours data window) containing the predicted "unhealthy" classification including the impending climate control failure of the TCCS to the corresponding recipient 260.

The machine learning system 400 further includes a monitoring module 440. The monitoring module 440 is configured to detect changes in the model performance and detect indicators that the model need to be retrained, retuned, or updated, to ensure that the machine learning model is valid. For example, when a design change or a manufacture change is made to address field climate control failures of the unit, the trained machine learning model may eventually become stale and need to be retrained. The monitoring module 440 can monitor the performance of the model to determine when or whether the model needs to be retrained using new or updated data to ensure that the model is still valid.

In an embodiment, the monitoring module 440 can monitor or detect a label drift of the model. In an embodiment, the label of predictions made by the machine learning model can be e.g., "healthy" or "unhealthy" for a unit. The monitoring module 440 can monitor the number of changes in e.g., the distribution of "unhealthy" prediction using e.g., statistical process control (SPC). It will be appreciated that SPC can be refer to a method of quality control that uses statistical methods to monitor and control a process. In an embodiment, the model can be run, e.g., daily or during any suitable predetermined period of time, with new data (new daily control and/or operational parameters, warrantee data and/or service records, etc.) of the units, and the units can be predicted and labeled by the trained model as "healthy" or "unhealthy" based on the new data. For example, typically about 1%-2% of units is predicted and labeled as "unhealthy". If the percentage of the unit (monitored by the monitoring module 440) exceeds a predetermined threshold in a predetermined period of time (e.g., 10% of all units are predicted and labeled by the trained model as "unhealthy" in e.g., three consecutive days, or 15% of all units are predicted and labeled by the trained model as "unhealthy" in a day), there can be a label drift indicating that the model needs to be updated, retrained, or retuned. In an embodiment, SPC can be used by the monitoring module 440. For example, the monitoring module 440 can monitor a statistical characteristic (e.g., mean, standard deviation, etc.) of the distribution of the "unhealthy" label predicted by the trained model during a predetermined period of time. If the statistical characteristic of the distribution of the "unhealthy" label is beyond a desired range, the monitoring module 440 can generate warning indicating that the model needs to be updated, retrained, or retuned. For example, if in three consecutive days, the distribution of the "unhealthy" label is beyond two standard deviations from the mean, the monitoring module 440 can generate a warning.

In an embodiment, the monitoring module 440 can also monitor or detect a model drift. Model drift can indicate changes in model performance (e.g., precision of the prediction in view of actual recall of a unit due to failures) using e.g., SPC. In an embodiment, the monitoring module 440 can monitor the prediction of the units by the trained model in view of the warrantee data (indicating that failures occurred and that users made warrantee claims) and/or service records of the units or the feedback data based on the inspection results. If the number of units labeled as "unhealthy" exceeds the number of warrantee claims plus a predetermined threshold in a predetermined period of time, or the number of units labeled as "healthy" is below the number of warrantee claims minus a predetermined threshold in a predetermined period of time, the monitoring module 440 can generate warning indicating that the model needs to be updated, retrained, or retuned. For example, if the trained model predicts a lot of "unhealthy" units but there is not many warrantee data and/or service records from the field, or the trained model predicts some "healthy" units but there are a lot of warrantee claims from the field, the model needs to be retrained. Typically model drift may occur when a new failure mode of the TCCS is coming up, or when a fix is in place for an existing climate control failure mode, or there is some problem occurred in the manufacturing process, etc. In such case, the trained model does not match the actual scenario in in the field (i.e., what is predicted does not match what is actually happening in the field), the monitoring module 440 can generate a warning that the model may need to be updated, retrained, or retuned.

In an embodiment, the monitoring module 440 can further monitor or detect a data drift of the model. Data drift can indicate changes in the distribution of input data using SPC, to account for delays in validating a model drift. For example, when a unit is predicted as "unhealthy" by the trained model, due to a delay (e.g., up to sixty days or other predetermined period of time) of users filing warrantee claims, it is unknown whether the prediction is correct or wrong (i.e., or whether there is a model drift or not) until after the delay. To account for such situation, the monitoring module 440 can monitor the new data (e.g., daily control or operational parameters, as input to the trained model to predict) distribution of the unit, and monitor the difference between the new data distribution and the previous input data (on which the model was trained) distribution. If the differences (e.g., the deviation of the inference data from the training data over time) between the previous input data on which the model was trained and the new data that is coming every day exceeds a predetermined threshold, the monitoring module 440 can generate a warning, that the model may need to be updated, retrained, or retuned.

Figure 5:
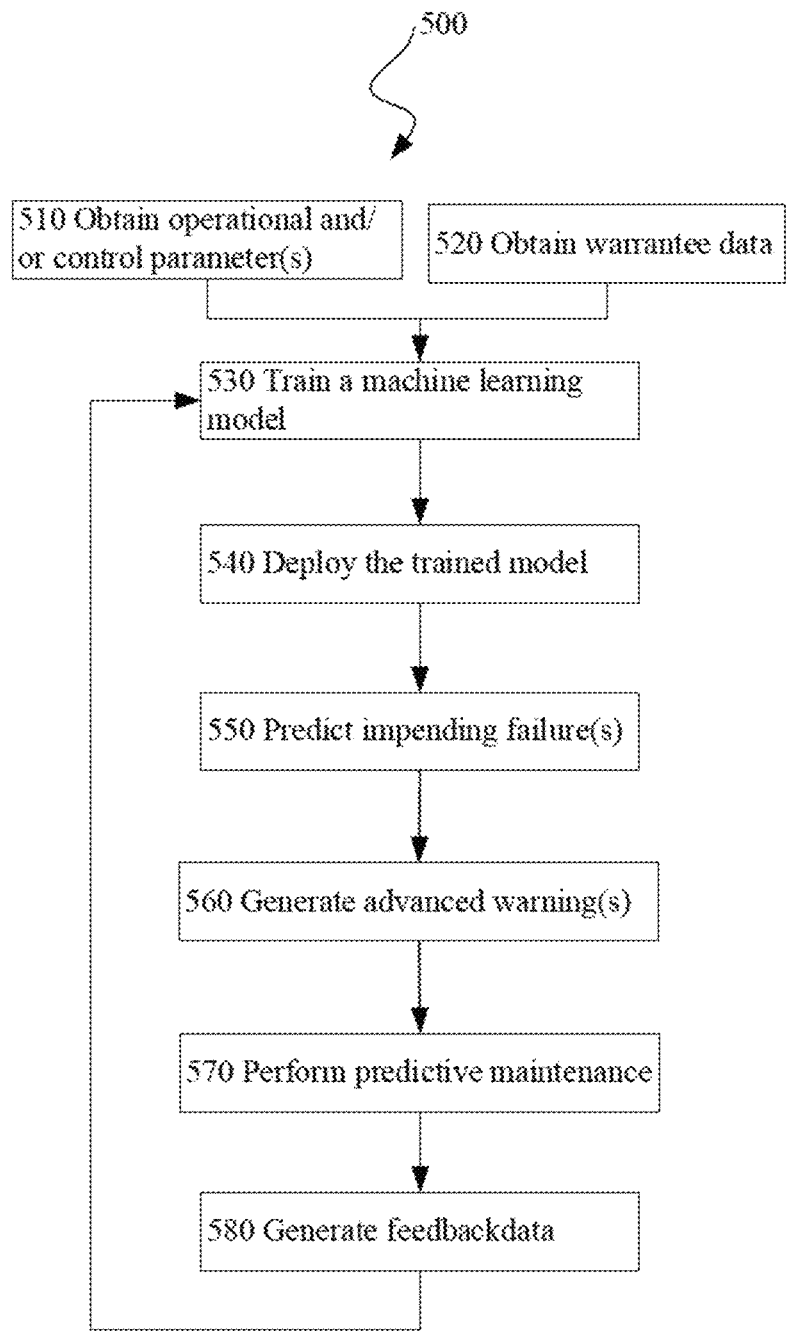
FIG. 5 is a flow chart illustrating a method for the system of FIG. 2 detecting symptoms and providing advanced warnings of an impending climate control failure for a transport climate control system, according to an embodiment.

FIG. 5 is a flow chart illustrating a method 500 for the system 200 of FIG. 2 detecting symptoms and providing an advanced warning of an impending climate control failure for a transport climate control system, according to an embodiment. It will be appreciated that although the method is illustrated as discrete blocks, various blocks may be divided into additional blocks, combined into fewer blocks, or eliminated, depending on the desired implementation.

The method 500 begins at 510 or 520. At 510, a backend of a machine learning system obtains operational parameters and/or control parameters from one or more units. One or more sensors of the unit can be configured to detect or sense operational parameters of the unit, and a data logger of the unit can be configured to store the sensed operational parameters. A controller of the unit can be configured to determine and provide control parameters, and the data logger of the unit can be configured to store the control parameters. In an embodiment, the data logger can be a part of and within the controller or be a part of and within telematics device. The parameters stored in the data logger can be communicated with the backend (e.g., daily, in a predetermined period of time, or real-time, etc.) via e.g., telematics. Each parameter can have a timestamp associated with the parameter and can associate with the unit using a unit identification. The method then proceeds to 530.

At 520, the backend of the machine learning system obtains warrantee data or other service records/history data of the one or more unit. Each warrantee data and/or service records can have a timestamp associated with the warrantee data and/or service records and can associate with the unit using a unit identification. The method then proceeds to 530.

At 530, the obtained raw data (operational parameters, control parameters, warrantee data and/or service records, etc.) can be preprocessed (as described in the description of FIG. 2) to produce derived features, aggregated features, feeding feature, unit features, alarm data (e.g., the number of each alarm code associated with specific failure modes that occur during a data window), etc. The preprocessed data and/or raw data can be used as training data to train a machine learning model to identify e.g., "healthy" and "unhealthy" units. The method then proceeds to 540.

At 540, the trained model can be saved/stored (e.g., in a data store or memory of the machine learning system) and deployed for inference (e.g., by the model deployment infrastructure 250 as described in the description of FIG. 2). The method then proceeds to 550. At 550, the trained model can be executed with new operational and control parameters (e.g., output from 510) from the unit(s) as input to the trained model to predict the impending climate control failure of the unit(s) for a data window. The method then proceeds to 560. At 560, the output (e.g., inference data) of the trained model can be interpreted to generate an advanced warning to a recipient. The method then proceeds to 570.

At 570, the operator of the unit can bring the unit to the recipient (e.g., a TCCS dealer, etc.) for predictive maintenance. The recipient can perform the predictive maintenance and fix the unit if necessary. The method then proceeds to 580.

At 580, the recipient can generate feedback data based on the results from the predictive maintenance. The feedback data can be fed to 530 to retrain the model if necessary.

Embodiments disclosed herein can predict failures and provide advanced warnings before the failure occurs in the field, and thus can mitigate and prevent the cargo (e.g., pharmaceuticals, etc.) loss. Embodiments disclosed herein can also help to identify design changes or fixes for components that have frequent failures. Embodiments disclosed herein can further adapt to changes (e.g., by retraining the model, etc.) when the predicted failures are fixed.

ASPECTS

It is appreciated that any one of aspects 1-14 can be combined with aspect 15.

Aspect 1. A method for predicting an impending climate control failure for a transport temperature control system (TCCS), the method comprising:
- a backend obtaining one or more operational parameters and/or one or more control parameters of transport temperature control systems including the TCCS;
- the backend obtaining service records for the transport temperature control systems;
- training a machine learning model with the service records for the transport temperature control systems, and at least one of the operational parameters of the transport temperature control systems or the control parameters of the transport temperature control systems;
- deploying the trained machine learning model;
- predicting the impending climate control failure for the TCCS based on the trained machine learning model, operational parameters of the TCCS, and/or control parameters of the TCCS; and
- outputting the predicted impending climate control failure for the TCCS.

Aspect 2. The method of aspect 1, wherein the backend obtaining operational parameters and/or control parameters of transport temperature control systems includes:
- a plurality of sensors sensing the operational parameters of the transport temperature control systems; and/or
- one or more controllers determining the control parameters of the transport temperature control systems; and
- telematics communicating the operational parameters and/or the control parameters of the transport temperature control systems to the backend.

Aspect 3. The method of aspect 1 or aspect 2, wherein training the machine learning model includes:
- deriving features from the operational parameters of the transport temperature control systems, and/or the control parameters of the transport temperature control systems, and the service records for the transport temperature control systems;
- generating aggregated features based on the derived features;
- determining feeding features based on the aggregated features; and
- training the machine learning model with the feeding features.

Aspect 4. The method of aspect 3, wherein the derived features include one of more of a difference between a return air temperature and a discharge air temperature, an ambient setpoint differential, a return air setpoint differential, and a thermodynamic coefficient of performance.

Aspect 5. The method of aspect 3 or aspect 4, further comprising:
- determining alarm data during a predetermined window; and
- deriving unit features for the transport temperature control systems,
- wherein training the machine learning model includes training the machine learning model with the feeding features, the alarm data, and the derived unit features.

Aspect 6. The method of any one of aspects 1-5, further comprising:
- determining feedback from inspecting and/or fixing the predicted impending climate control failure for the TCCS,
- wherein training the machine learning model includes training the machine learning model with the determined feedback.

Aspect 7. The method of any one of aspects 1-6, further comprising:
- transforming the predicted impending climate control failure for the TCCS to an advanced warning; and
- alerting a recipient the advanced warning through an electronic communication.

Aspect 8. The method of any one of aspects 1-7, further comprising: determining a failure rate of the predicted impending climate control failure; and
- when the failure rate exceeds a predetermined threshold, retraining the machine learning model.

Aspect 9. The method of any one of aspects 1-7, further comprising:
- obtaining field failure events for the TCCS; and
- when the field failure events do not match the predicted impending climate control failure, retraining the machine learning model.

Aspect 10. The method of any one of aspects 1-7, further comprising:
- after predicting the impending climate control failure for the TCCS, obtaining a first set of operational parameters and/or control parameters of the TCCS during a first predetermined period of time; and
- obtaining a second set of operational parameters and/or control parameters of the TCCS during a second predetermined period of time;
- when a difference between the first set and the second set exceeds a predetermined threshold, retraining the machine learning model.

Aspect 11. The method of any one of aspects 1-10, wherein the predicted impending climate control failure for the TCCS includes one or more of compressor failures, refrigerant leaks, expansion valve failures, evaporate coil failures, condenser coil failures, idler assembly failures, tensioner failures, belt failures, alternator failures, and battery failures.

Aspect 12. The method of any one of aspects 1-11, wherein the operational parameters and/or the control parameters of transport temperature control systems include an electronic throttling valve position, a suction pressure, and a discharge pressure.

Aspect 13. The method of any one of aspects 1-12, wherein the operational parameters and/or the control parameters of transport temperature control systems include an ambient temperature, a shunt current, and a battery voltage; and
- the predicted impending climate control failure for the TCCS includes battery failures.

Aspect 14. The method of any one of aspects 1-13, further comprising:
- performing a predictive maintenance on the TCCS based on the predicted impending climate control failure for the TCCS.

Aspect 15. A method for predicting an impending climate control failure for a transport temperature control system (TCCS), the method comprising:
- a plurality of sensors sensing one or more operational parameters of transport temperature control systems including the TCCS; and/or one or more controllers determining one or more control parameters of the transport temperature control systems;

telematics communicating the operational parameters and/or the control parameters of the transport temperature control systems to a backend;

obtaining service records for the transport temperature control systems;

training a machine learning model with the service records for the transport temperature control systems, and at least one of the operational parameters of the transport temperature control systems or the control parameters of the transport temperature control systems;

deploying the trained machine learning model;

predicting the impending climate control failure for the TCCS based on the trained machine learning model, operational parameters of the TCCS, and/or control parameters of the TCCS; and performing a predictive maintenance on the TCCS based on the predicted impending climate control failure for the TCCS.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for predicting an impending climate control failure for a transport climate control system (TCCS), the method comprising:
    a plurality of sensors sensing one or more operational parameters;
    one or more controllers determining one or more control parameters;
    a backend obtaining the one or more operational parameters and/or the one or more control parameters of transport climate control systems including the TCCS;
    the backend obtaining service records for the transport climate control systems;
    training a machine learning model with the service records for the transport climate control systems, and at least one of the one or more operational parameters of the transport climate control systems or the one or more control parameters of the transport climate control systems;
    transforming the one or more operational parameters and/or the one or more control parameters for training the machine learning model by applying a data window based on timestamp of each of the one or more operational parameters and/or the one or more control parameters;
    deploying the trained machine learning model;
    predicting the impending climate control failure for the TCCS using the trained machine learning model, the one or more operational parameters of the TCCS, and/or the one or more control parameters of the TCCS;
    transforming the predicted impending climate control failure into a warning;
    determining maintenance on the TCCS being performed based on the warning;
    determining a repair of the TCCS being conducted based on the performed maintenance; and
    determining feedback based on the performed maintenance,
    wherein training the machine learning model includes training the machine learning model with the determined feedback.

2. The method of claim 1, wherein the backend obtaining the one or more operational parameters and/or the one or more control parameters of transport climate control systems includes:
    telematics communicating the one or more operational parameters and/or the one or more control parameters of the transport climate control systems to the backend.

3. The method of claim 1, wherein training the machine learning model includes:
    deriving features from the one or more operational parameters of the transport climate control systems, and/or the one or more control parameters of the transport climate control systems, and the service records for the transport climate control systems;
    generating aggregated features based on the derived features;
    determining feeding features based on the aggregated features; and
    training the machine learning model with the feeding features.

4. The method of claim 3, wherein the derived features include one or more of a difference between a return air temperature and a discharge air temperature, an ambient setpoint differential, a return air setpoint differential, and a thermodynamic coefficient of performance.

5. The method of claim 3, further comprising:
    determining alarm data during a predetermined window; and
    deriving unit features for the transport climate control systems,
    wherein training the machine learning model includes training the machine learning model with the feeding features, the alarm data, and the derived unit features.

6. The method of claim 1, further comprising:
    alerting a recipient the warning through an electronic communication.

7. The method of claim 1, further comprising:
    determining a failure rate of the predicted impending climate control failure; and
    when the failure rate exceeds a predetermined threshold, retraining the machine learning model.

8. The method of claim 1, further comprising:
    obtaining field failure events for the TCCS; and
    when the field failure events do not match the predicted impending climate control failure, retraining the machine learning model.

9. The method of claim 1, further comprising:
    after predicting the impending climate control failure for the TCCS, obtaining a first set of the one or more operational parameters and/or the one or more control parameters of the TCCS during a first predetermined period of time; and
    obtaining a second set of the one or more operational parameters and/or the one or more control parameters of the TCCS during a second predetermined period of time;

when a difference between the first set and the second set exceeds a predetermined threshold, retraining the machine learning model.

10. The method of claim 1, wherein the predicted impending climate control failure for the TCCS includes one or more of compressor failures, refrigerant leaks, expansion valve failures, evaporate coil failures, condenser coil failures, idler assembly failures, tensioner failures, belt failures, alternator failures, and battery failures.

11. The method of claim 1, wherein the one or more operational parameters and/or the one or more control parameters of transport climate control systems include an electronic throttling valve position, a suction pressure, and a discharge pressure.

12. The method of claim 1, wherein the one or more operational parameters and/or the one or more control parameters of transport climate control systems include an ambient temperature, a shunt current, and a battery voltage; and the predicted impending climate control failure for the TCCS includes battery failures.

13. The method of claim 1,
wherein the performed maintenance is a predictive maintenance.

14. A method for predicting an impending climate control failure for a transport climate control system (TCCS), the method comprising:
    a plurality of sensors sensing one or more operational parameters;
    one or more controllers determining one or more control parameters;
    a backend obtaining the one or more operational parameters and/or the one or more control parameters of transport climate control systems including the TCCS;
    the backend obtaining service records for the transport climate control systems;
    training a machine learning model with the service records for the transport climate control systems, and at least one of the one or more operational parameters of the transport climate control systems or the one or more control parameters of the transport climate control systems;
    transforming the one or more operational parameters and/or the one or more control parameters for training the machine learning model by applying a data window based on timestamp of each of the one or more operational parameters and/or the one or more control parameters;
    deploying the trained machine learning model;
    predicting the impending climate control failure for the TCCS using the trained machine learning model, the one or more operational parameters of the TCCS, and/or the one or more control parameters of the TCCS;
    transforming the predicted impending climate control failure into a warning;
    determining maintenance on the TCCS being performed based on the warning; and
    determining a repair of the TCCS being conducted based on the performed maintenance, the method further comprising:
        determining a failure rate of the predicted impending climate control failure, and when the failure rate exceeds a predetermined threshold, retraining the machine learning model; or
        obtaining field failure events for the TCCS, and when the field failure events do not match the predicted impending climate control failure, retraining the machine learning model; or
        after predicting the impending climate control failure for the TCCS, obtaining a first set of the one or more operational parameters and/or the one or more control parameters of the TCCS during a first predetermined period of time, obtaining a second set of the one or more operational parameters and/or the one or more control parameters of the TCCS during a second predetermined period of time, and when a difference between the first set and the second set exceeds a predetermined threshold, retraining the machine learning model.

15. The method of claim 1, further comprising:
transforming the service records with one or more timestamps to produce features for training the machine learning model.

16. The method of claim 1, further comprising:
tuning parameters of the machine learning model based on a risk tolerance to adjust the machine learning model.

* * * * *